(12) United States Patent
Stelmar Netto et al.

(10) Patent No.: US 11,316,886 B2
(45) Date of Patent: Apr. 26, 2022

(54) PREVENTING VULNERABLE CONFIGURATIONS IN SENSOR-BASED DEVICES

(71) Applicant: International Business Machines Corporation, Armonk, NY (US)

(72) Inventors: Marco Aurelio Stelmar Netto, Sao Paulo (BR); Vagner Figueredo de Santana, São Paulo (BR); Bruno Silva, São Paulo (BR); Renato Luiz de Freitas Cunha, São Paulo (BR); Fernando Luiz Koch, Greenwich, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 245 days.

(21) Appl. No.: 16/777,993

(22) Filed: Jan. 31, 2020

(65) Prior Publication Data

US 2021/0243217 A1  Aug. 5, 2021

(51) Int. Cl.
*H04L 9/40* (2022.01)
*G06F 9/445* (2018.01)
*H04L 29/06* (2006.01)

(52) U.S. Cl.
CPC ...... *H04L 63/1433* (2013.01); *G06F 9/44505* (2013.01); *H04L 63/1416* (2013.01); *H04L 63/1425* (2013.01); *H04L 63/1466* (2013.01); *H04L 63/20* (2013.01)

(58) Field of Classification Search
CPC .......... H04L 63/1433; H04L 63/1416; H04L 63/1425; H04L 63/1466; H04L 63/20; G06F 9/44505

USPC ...................................... 726/22–25
See application file for complete search history.

(56) References Cited

U.S. PATENT DOCUMENTS

| 6,279,113 | B1 * | 8/2001 | Vaidya | H04L 63/1416 709/229 |
| 7,013,395 | B1 * | 3/2006 | Swiler | H04L 63/1433 713/153 |
| 7,603,709 | B2 * | 10/2009 | Lewis | H04L 63/1458 726/23 |
| 8,166,551 | B2 * | 4/2012 | King | G06F 21/577 726/25 |

(Continued)

FOREIGN PATENT DOCUMENTS

WO    2017210198 A1    12/2017

*Primary Examiner* — Kambiz Zand
*Assistant Examiner* — Mahabub S Ahmed
(74) *Attorney, Agent, or Firm* — Cantor Colburn LLP; Joseph Petrokaitis (57) ABSTRACT

Aspects of the invention include a computer-implemented method, including performing simulations of a form of cyber-attack based on different input parameters to determine a respective time to perform each cyber-attack on a plurality of features of a sensor-based device. Additionally, performing simulations of a plurality of mitigating processes for each cyber-attack based on different input parameters to determine a respective time to perform each mitigating process. An associated risk level of each cyber-attack is determined based at least in part on the simulations. A mitigation process is selected based at least in part on the associated risk levels.

19 Claims, 7 Drawing Sheets

(56) References Cited

U.S. PATENT DOCUMENTS

| | | | |
|---|---|---|---|
| 8,407,798 B1* | 3/2013 | Lotem | G06F 21/577 |
| | | | 726/21 |
| 8,595,822 B2 | 11/2013 | Schrecker et al. | |
| 9,325,728 B1* | 4/2016 | Kennedy | H04L 63/1433 |
| 9,495,188 B1* | 11/2016 | Ettema | H04L 63/0245 |
| 9,507,944 B2* | 11/2016 | Lotem | G06F 21/55 |
| 9,537,884 B1* | 1/2017 | Raugas | H04L 63/1433 |
| 9,633,197 B2 | 4/2017 | Lakshmanan et al. | |
| 9,680,855 B2* | 6/2017 | Schultz | G09C 1/00 |
| 9,892,260 B2* | 2/2018 | Kotler | G06F 21/577 |
| 10,447,554 B2 | 10/2019 | Gupta | |
| 10,505,967 B1* | 12/2019 | Schwartz | H04L 63/1433 |
| 10,581,902 B1* | 3/2020 | Krishtal | H04L 63/0236 |
| 2006/0021050 A1* | 1/2006 | Cook | H04L 63/1433 |
| | | | 726/25 |
| 2008/0005555 A1* | 1/2008 | Lotem | G06F 21/55 |
| | | | 713/150 |
| 2009/0007270 A1* | 1/2009 | Futoransky | H04L 63/1433 |
| | | | 726/25 |
| 2011/0185432 A1* | 7/2011 | Sandoval | H04L 63/1433 |
| | | | 726/25 |
| 2013/0347085 A1* | 12/2013 | Hawthorn | G06F 21/577 |
| | | | 726/6 |
| 2013/0347116 A1* | 12/2013 | Flores | H04L 63/1433 |
| | | | 726/25 |
| 2014/0137257 A1* | 5/2014 | Martinez | H04L 63/1433 |
| | | | 726/25 |
| 2014/0199664 A1* | 7/2014 | Sadeh-Koniecpol | |
| | | | G06F 21/554 |
| | | | 434/118 |
| 2014/0337086 A1* | 11/2014 | Asenjo | H04L 41/0896 |
| | | | 705/7.28 |
| 2014/0337429 A1* | 11/2014 | Asenjo | G06Q 10/0637 |
| | | | 709/204 |
| 2015/0106939 A1* | 4/2015 | Lietz | H04L 63/1433 |
| | | | 726/25 |
| 2015/0347902 A1* | 12/2015 | Butler, Jr. | G08B 25/009 |
| | | | 706/46 |
| 2015/0373035 A1* | 12/2015 | Patne | G06F 21/556 |
| | | | 726/25 |
| 2015/0381649 A1* | 12/2015 | Schultz | G06Q 10/0635 |
| | | | 726/25 |
| 2016/0028764 A1* | 1/2016 | Vasseur | H04L 63/1416 |
| | | | 726/23 |
| 2016/0134653 A1* | 5/2016 | Vallone | H04L 41/046 |
| | | | 726/25 |
| 2016/0285904 A1* | 9/2016 | Ye | H04L 63/1425 |
| 2016/0285907 A1* | 9/2016 | Nguyen | H04L 63/1433 |
| 2016/0308895 A1* | 10/2016 | Kotler | G06F 21/577 |
| 2016/0358497 A1* | 12/2016 | Nguyen | G09B 9/085 |
| 2016/0359915 A1* | 12/2016 | Gupta | H04L 63/1416 |
| 2017/0034023 A1* | 2/2017 | Nickolov | H04L 43/0817 |
| 2017/0046519 A1* | 2/2017 | Cam | G06F 21/577 |
| 2017/0126712 A1* | 5/2017 | Crabtree | G06N 20/00 |
| 2017/0244746 A1* | 8/2017 | Hawthorn | H04L 63/1408 |
| 2017/0289184 A1* | 10/2017 | C | H04L 63/1425 |
| 2017/0324768 A1* | 11/2017 | Crabtree | H04L 63/1433 |
| 2017/0331847 A1* | 11/2017 | Alexander | H04L 63/1433 |
| 2018/0048669 A1* | 2/2018 | Lokamathe | G06N 5/04 |
| 2018/0099643 A1* | 4/2018 | Golsch | H04W 4/30 |
| 2018/0191729 A1 | 7/2018 | Whitti et al. | |
| 2018/0191773 A1* | 7/2018 | O'Connell | H04L 47/225 |
| 2018/0219909 A1* | 8/2018 | Gorodissky | H04L 43/50 |
| 2018/0278498 A1* | 9/2018 | Zeng | H04L 43/045 |
| 2018/0316701 A1* | 11/2018 | Holzhauer | H04L 63/1433 |
| 2018/0332069 A1* | 11/2018 | Moore | H04L 63/1433 |
| 2018/0351987 A1* | 12/2018 | Patel | G06F 21/577 |
| 2019/0052664 A1* | 2/2019 | Kibler | G06F 11/301 |
| 2019/0081974 A1* | 3/2019 | Lasser | H04L 63/1433 |
| 2019/0132347 A1* | 5/2019 | Wakid | H04W 12/009 |
| 2019/0149572 A1* | 5/2019 | Gorodissky | H04L 63/1408 |
| | | | 726/25 |
| 2019/0188342 A1* | 6/2019 | Hershey | G06F 17/11 |
| 2019/0243977 A1* | 8/2019 | Pfleger de Aguiar | G05B 19/05 |
| 2019/0245883 A1* | 8/2019 | Gorodissky | G06F 21/577 |
| 2019/0258807 A1* | 8/2019 | DiMaggio | G06F 21/577 |
| 2019/0258953 A1* | 8/2019 | Lang | G06N 3/0454 |
| 2019/0266297 A1* | 8/2019 | Krause | G05B 23/0245 |
| 2019/0312890 A1* | 10/2019 | Perilli | G06N 20/00 |
| 2019/0347423 A1* | 11/2019 | Sanossian | H04L 41/0853 |
| 2019/0349392 A1* | 11/2019 | Wetterwald | H04L 43/0852 |
| 2020/0043008 A1* | 2/2020 | Hrabik | G06Q 20/405 |
| 2020/0186563 A1* | 6/2020 | Convertino | G06N 20/00 |
| 2020/0252423 A1* | 8/2020 | Hogg | G06Q 40/08 |
| 2020/0274894 A1* | 8/2020 | Argoeti | H04L 63/1408 |
| 2020/0280577 A1* | 9/2020 | Segal | H04L 63/1433 |
| 2020/0285997 A1* | 9/2020 | Bhattacharyya | G06N 7/00 |
| 2020/0314134 A1* | 10/2020 | Izrael | H04L 63/1433 |
| 2020/0351298 A1* | 11/2020 | Paturi | G06N 5/04 |
| 2021/0021628 A1* | 1/2021 | Sbandi | H04L 63/105 |
| 2021/0021636 A1* | 1/2021 | Sbandi | H04L 63/1441 |
| 2021/0037027 A1* | 2/2021 | Brown | G06F 21/552 |
| 2021/0037050 A1* | 2/2021 | Ree | G16Y 20/30 |
| 2021/0075794 A1* | 3/2021 | Gazit | H04L 43/0876 |
| 2021/0185084 A1* | 6/2021 | Sodja | H04L 63/1425 |
| 2021/0192057 A1* | 6/2021 | Helfman | H04L 63/1408 |
| 2021/0297443 A1* | 9/2021 | Crabtree | H04L 63/123 |
| 2021/0301985 A1* | 9/2021 | Brown | G06Q 10/20 |
| 2021/0365835 A1* | 11/2021 | Baumard | G06N 20/00 |

* cited by examiner

PREVENTING VULNERABLE CONFIGURATIONS IN SENSOR-BASED DEVICES

BACKGROUND

The present invention generally relates to programmable computers, and more specifically, to computer systems, computer program products, and computer-implemented methods configured and arranged to prevent vulnerabilities in smart sensor devices.

Smart sensors collect inputs from the physical environment and use connected computing resources to perform predefined functions upon detection of certain inputs, process data, and transmit the processed data to other computing devices. Smart sensors are integral to Internet of Things (IoT), which refers to providing various real-world things, such as streets, buildings, security systems, and household appliances with sensing devices, connecting them through the Internet, so as to achieve remote control or direct communication between these real-world things. The IoT has connected real-world things from electronics to plant and animal wildlife, by means of radio frequency identifications (RFIDs), sensors, binary codes, and the like provided for various kinds of devices connected to wired/wireless networks via interfaces. As a result, all the real-world things can be monitored and operated through networking and their behaviors can be programmed for human convenience.

SUMMARY

Embodiments of the present invention are directed to preventing vulnerabilities in smart sensor-based devices. A non-limiting example computer-implemented method includes including performing simulations of a form of cyber-attack based on different input parameters to determine a respective time to perform each cyber-attack on a plurality of features of a sensor-based device. Additionally, performing simulations of a plurality of mitigating processes for each cyber-attack based on different input parameters to determine a respective time to perform each mitigating process. An associated risk level of each cyber-attack is determined based at least in part on the simulations. A mitigation process is selected based at least in part on the associated risk levels.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer systems and computer-implemented methods that calculate the risk of a threat to a sensor-based device and presenting a list of risk levels and a risk mitigating process for identified threats.

Hardware devices may be equipped with a smart sensor to transmits data from one location to another. For example, different types of IoT devices include wireless sensors, software, actuators, and computer devices. These devices can be embedded into, for example, mobile devices, industrial equipment, environmental sensors, and medical devices. Smart sensor-based devices convey usage and other data, and can potentially provide insights that lead companies to reduce costs, gain efficiency, and identify new business opportunities. For example, Smart sensor-based devices are used by companies to monitor traffic flow in, through, and out of a retail store Smart sensor-based devices are also used by individuals to personalize television content or monitor exercise routines. The networking, communication, and connectivity protocols used by Smart sensor-based devices enable them to readily connect to public and private networks to enable these services.

The ease of connecting to smart sensor-based devices permits easy use for individuals and companies, and simultaneously leaves the devices exposed to unintended connections with third parties, whether malicious or innocuous. In either case, the relative ease of connecting to a smart sensor-based devices raises security and privacy concerns. However, providing safeguarding features to a smart sensor-based devices introduces its own challenges, as mitigating a potential risk may be burdensome to install or diminish the performance of valued features of the smart sensor-based devices.

One or more embodiments of the present invention address one or more of the above-described shortcomings by providing systems and methods that assess the risk to a smart sensor-based devices based on an estimated time to perform an cyber-attack versus an estimated mitigation time. Furthermore, based on the assessed risk, a list of risk level and potential mitigating steps are provided to a user.

Figure 1:
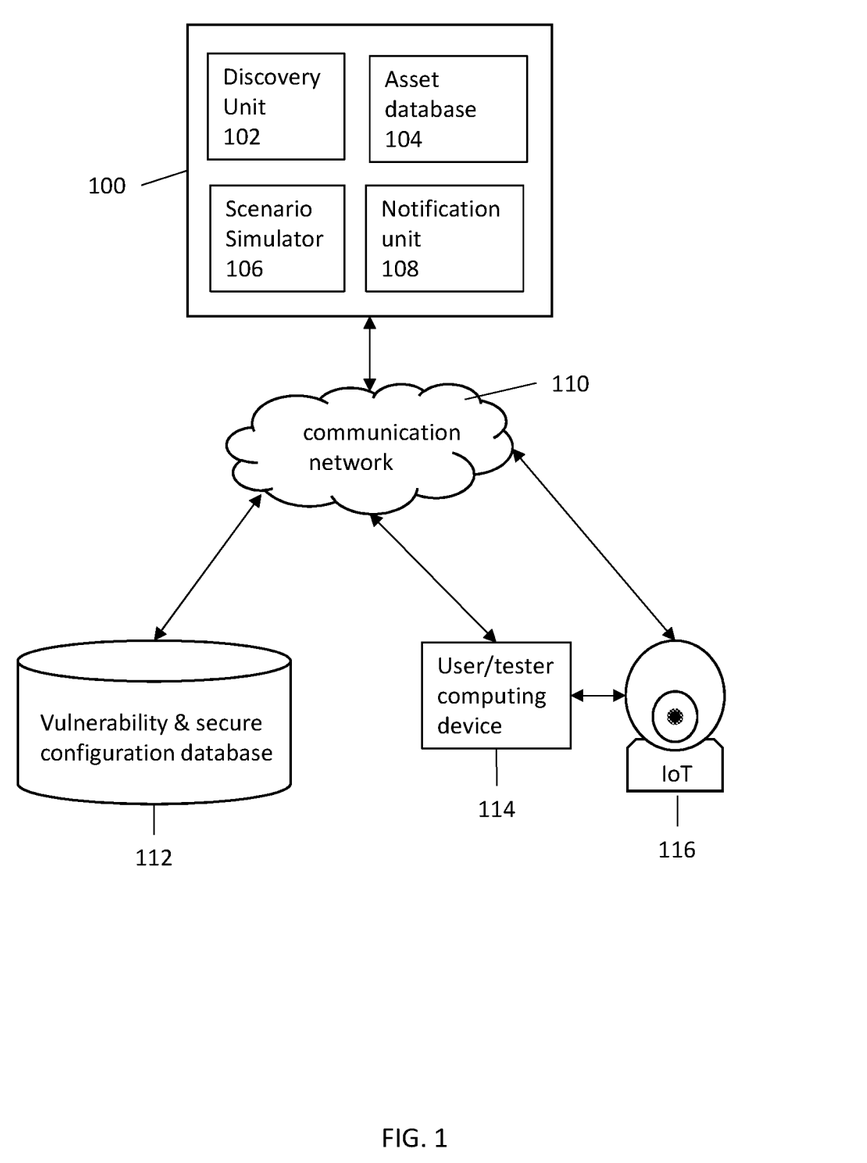
FIG. 1 illustrates a block diagram of components of a smart sensor-based device vulnerability prevention system in accordance with one or more embodiments of the present invention.

Turning now to FIG. 1, a system 100 for preventing vulnerabilities of smart sensor-based devices, for example, IoT devices, is generally shown in accordance with one or more embodiments of the present invention. In an embodiment of the present invention, the system 100 communicates with a smart sensor-based device 116 via a wired or wireless communication network 110 using technologies such as Ethernet, fiber optics, microwave, xDSL (Digital Subscriber Line), Wireless Local Area Network (WLAN) technology, wireless cellular technology, Bluetooth technology, a cloud-based network, and/or any other appropriate technology. In some instances, the system 100 communicates with a user's computing device 114. A discovery unit 102 interfaces with the smart sensor-based device 116 to retrieve a configuration file and a firmware version of the smart sensor-based device. An asset database 104 stores configuration files and firmware versions of each previously analyzed smart sensor-based devices.

The scenario simulator 106 communicates with a database 112, which includes reported methods and instances of cyber-attacks on smart sensor-based devices submitted from various sources, including academics, security professionals, and researchers. The database 112 may be available via the internet or in storage in an external memory device. The database 112 may include an external third-party database, an internal proprietary database, such as the asset database 104, or a combination of both. In each instance that the system 100 discovers a method of cyber-attacking a smart sensor-based device 116 or class of smart sensor-based device 116, the system amends the description of the cyber-attack to the description of the smart sensor-based device 116 in the asset database 104. The system further compares the features of each described smart sensor-based device 116 to determine similarities and differences. If, in the instance that the features of a first smart sensor-based device surpass a threshold similarity of features to a second smart sensor-based device, the description of the second smart sensor-based device is amended to include the cyber-attack method as well. It should be appreciated that the scenario simulator 106 is operable to receive information regarding methods and techniques to cyber-attack a smart sensor-based device 116 from any appropriate source, for example, a website, manual input, and an electronic file.

The scenario simulator 106 is operable to analyze written/narrative reports from the database 112 using natural language processing (NLP) techniques to discern the methods and techniques for cyber-attacking a computing device. The scenario simulator 106 adopts machine learning techniques to perform NLP analysis on the submissions in the database 112, and NLP is utilized to derive meaning from the natural language. The scenario simulator 106 can analyze the content of the submissions by parsing, syntactical analysis, morphological analysis, and other processes, including statistical modeling and statistical analysis. The type of NLP analysis can vary by language and other considerations. The NLP analysis is utilized to generate a first set of NLP structures and/or features that can be utilized by a computer to identify and methods and techniques for cyber-attacking a smart sensor-based device 116.

The scenario simulator 106 models the smart sensor-based device 116, using parameters found in the configuration files and firmware files, and simulates different forms of cyber-attacks described in the database 112. Using techniques as natural language processing techniques or direct annotation, the scenario simulator 106 reviews submissions provided in the database to discern a time or time interval required to perform each step of an cyber-attack. For example, one document may indicate that detecting open device ports takes approximately two tot ten minutes, and another document indicates that accessing a device shell takes approximately twenty to forty minutes. Based on the detected times and a user-defined probability density function for each step, the scenario simulator 106 generates respective scenarios for different cyber-attack methods. The cyber-attack scenarios may be simulated multiple times to generate a probability distribution functions for each method of cyber-attack. The generated probability density functions may then be used to ass the risk of each method of cyber-attack in a given time frame.

Each simulation varies the inputs, for example, resources available to hackers, number of hackers, hacker's computing device capabilities, smart sensor device features, probability that a particular smart sensor-based device feature is targeted, etc. The scenario simulator 106 further provides an output as to an estimated time to successfully complete each cyber-attack on the smart sensor-based device 116. Each length of time is mapped on to a numerical distribution, for example, a histogram, a plot, a chart, or other distribution. The scenario simulator 106 determines whether the numerical distribution has converged. If the numerical distribution has not converged, the scenario simulator 106 continues to simulate cyber-attacks. Once the numerical distribution has converged, the scenario simulator 106 estimates a probability density function describing the different probabilities of a time required to perform the cyber-attacks.

The scenario simulator 106 also uses the model of the smart sensor-based device to simulate each step required to perform an cyber-attack to determine a probability distribution of times required to perform each step of the cyber-attack. This can be performed, for example, by using a discrete event simulation (DES) model, which varies the inputs, including, but not limited to, available resources, number of service people, available equipment, the experience of service people, etc. The scenario simulator 106 also provides an output as to an estimated time to successfully complete each step of a mitigating process. A mitigating process may be the inclusion of a safety feature, modifying a configuration file, modifying a firmware version, or disabling a feature. Each length of time is mapped on to a numerical distribution. The scenario simulator 106 determines whether the numerical distribution has converged. If the numerical distribution has not converged, the scenario simulator 106 continues to simulate to mitigating processes. Once the numerical distribution has converged, the scenario simulator 106 estimates a probability density function describing the probabilities of estimated times to perform a mitigating process.

Based on a comparison of the probability density functions of an cyber-attack and a mitigating process, the notification unit 108 transmits a list of mitigation processes and associated risk levels of each cyber-attack scenario to a user's computing device 114, or a service person's computing device. Based on the risk assessment, the system 100 evaluates which cyber-attack scenarios have the lowest risk level and which features should be mitigated (for example, disabled) to reduce a risk level. This can be achieved by simulating different mitigating processes and employing a configuration graph to determine if and which features should be mitigated.

In addition to the comparison, the notification unit 108 further bases the list of mitigation processes and associated risk levels on the mitigating process impact on a feature usage of the smart sensor-based device 116. For example, disabling image recording may be satisfactory for a smart sensor-based device 116 that performs multiple functions in addition to image recording, but would not be a suitable mitigation process for a camera-like device that only captures images. Furthermore, the notification unit 108 also communicates with the smart sensor-based device 116 to receive the usage data of each feature. If, for example, a percentage of a feature's usage is greater than a threshold percentage of total usage of all features, the notification unit 108 does not include disabling the feature in the list of mitigation processes.

Another parameter to consider when determining whether to perform a mitigation process is time. Each mitigation action requires time to complete. Therefore, depending on the situation, it may be faster to disable a system capability, rather than changing it to a more secure capability. For example, in the context of an IoT camera, it may be faster to disable the capability to transmit images over the internet than fix a bug in the transport protocol. This evaluation of which capabilities should be disabled or changed may calculated by using a configuration graph and the probability distribution functions.

Upon receiving a selection from a user, the system 100 assists the service people with the mitigation process. For example, if a user chooses to disable a feature, the system 100 modifies the configuration file or changes a firmware version of the smart sensor-based device 116 to enact the change. Simultaneously, the service people may assist by executing any necessary hardware changes to the smart sensor-based device 116.

Figure 2:
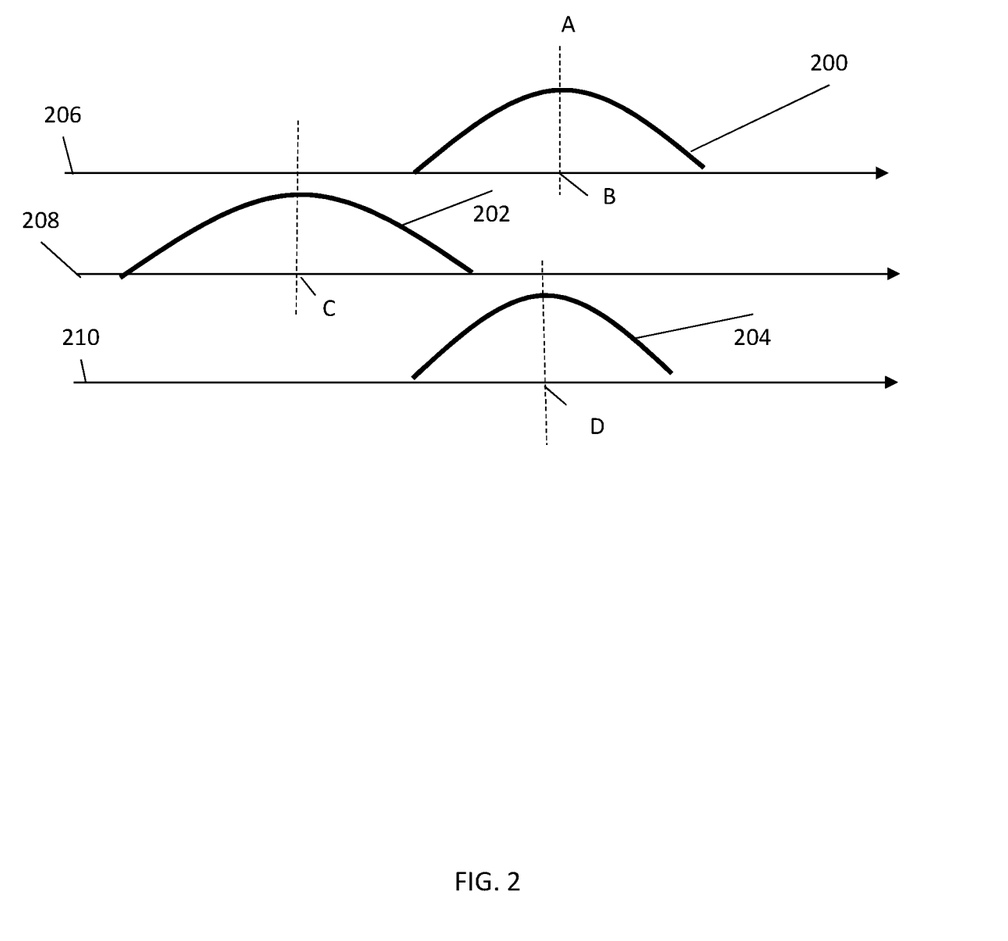
FIG. 2 illustrates numerical distributions of time required to cyber-attack a smart sensor-based device and time required to perform a mitigating process in accordance with one or more embodiments of the present invention.

Referring to FIG. 2, the probability density functions for time intervals for a completion time of a first cyber-attack method 200 on a device feature or features, a first mitigating process 202, and a second mitigating process 204 are shown. If the smart sensor-based device 116 is an image recording device, the first mitigating process may include, for example, disabling features that allow transmission of images over the internet, disabling high-resolution video, and removing remote access. The second mitigating process may include disabling a high frame rate, or ability to cast to a television. The horizontal arrows 206, 208, 210 represent a uniform time line, in which the probability density functions 200, 202, 204 begin at a respective least probable shortest completion time and end at a respective least probable greatest length of time of completion. The center of the probability density functions 200, 202, 204 represent the mean time to complete the cyber-attack. For example, dashed line A corresponds to the mean time length B for a hacker to complete the first cyber-attack method on a feature or features of a the smart sensor-based device 116. Cyber-attack methods include, but are not limited to accessing a network, injecting runnable codes, creating an access shell, obtaining video access, transmitting a live stream. As seen from the positioning of the probability density function of cyber-attack time 200 and the probability density function of the first mitigating process 202 along the time line, that a most probable length of time C to complete the first mitigating process is less than a most probable length of time B to complete the first cyber-attack method. It can further be seen that the most probable length of time D to complete the second mitigation process is roughly similar to the most probable length of time B to complete the first cyber-attack method. In this situation, the notification unit 108 would present the list of mitigation options, including disabling the features, and the associated risk levels.

Figure 3:
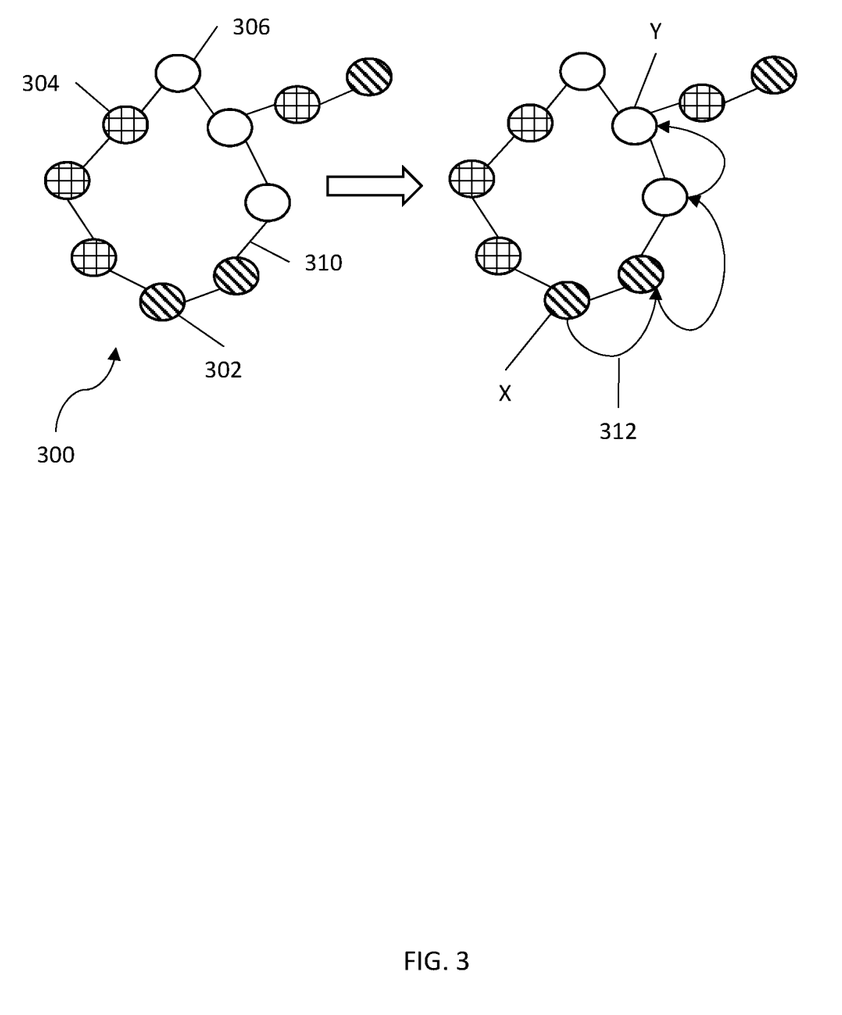
FIG. 3 illustrates a Markov model for determining a time interval for performing a mitigating process in accordance with one or more embodiments of the present invention.

Referring to FIG. 3, a Markov model 300 used to determine a time length of a mitigation process is shown. The Markov model includes high risk nodes 302, medium risk nodes 304, and low risk nodes 306, in which each node represents a configuration state and a firmware state for the smart sensor-based device 116. The nodes 302, 304, 306 are connected by edges, which represent a change in either the configuration state or the firmware state to move from a node to an adjacent node. Using historical data, the scenario simulator 106 determines estimated time intervals 312 for executing the change for different scenarios. For example, a first time interval would be determined if two experienced service people were modifying the smart sensor-based device 116, and a second time interval would be determined if the one experience service people and two inexperienced service people were modifying the smart sensor-based device 116. Then a total time interval for completed a mitigation process, for example, beginning at node X and ending at node Y is determined. The times for each edge can be also adjusted based on potential or current weather issues, a newness of a technology, mechanical issues. These time intervals are used to produce the probability density functions described in FIG. 2

Figure 4:
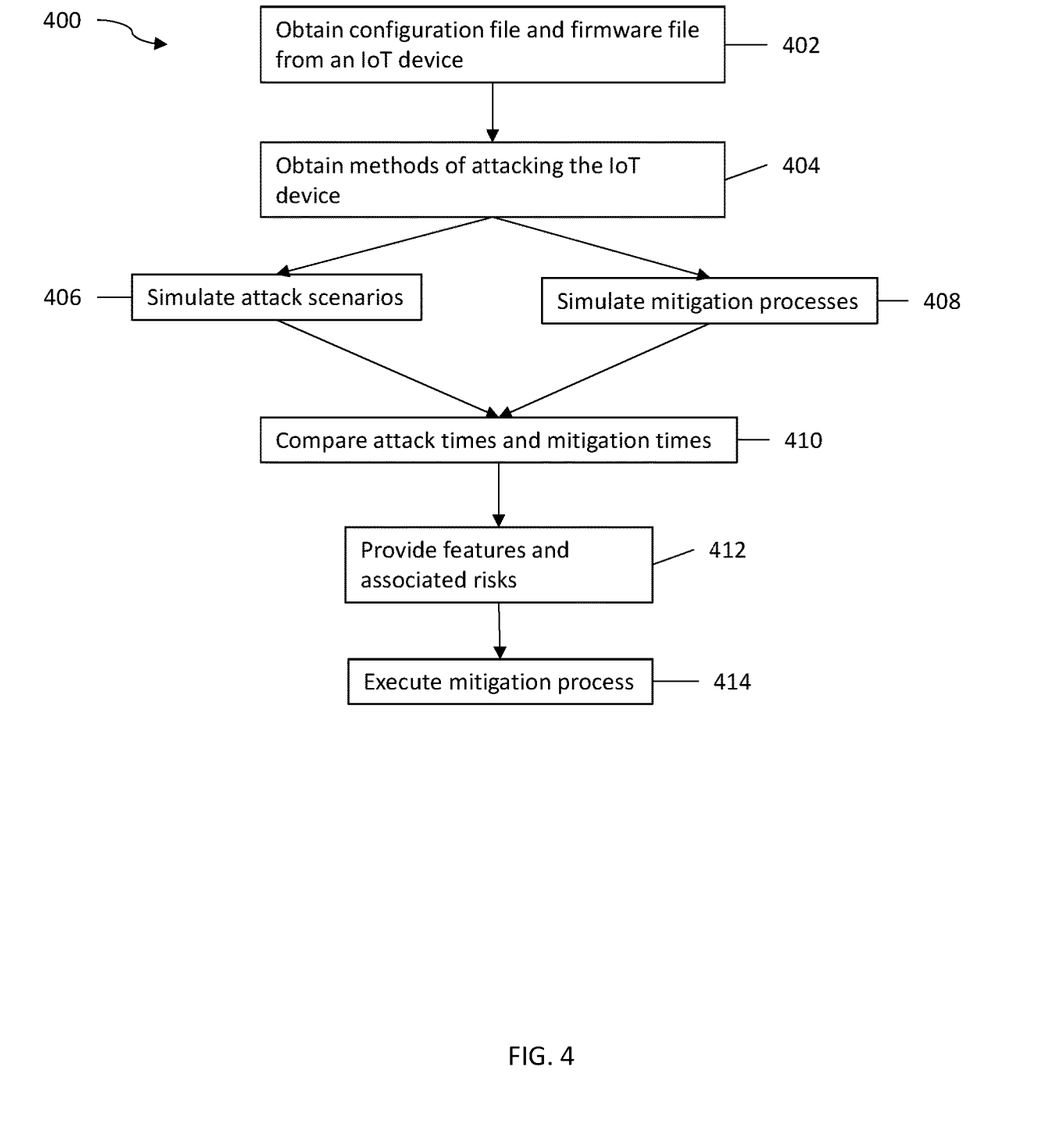
FIG. 4 illustrates a flow diagram of a process for vulnerability prevention of a smart sensor-based device in accordance with one or more embodiments of the present invention.

Referring to FIG. 4, a flow diagram of a process for vulnerability prevention of a smart sensor-based device is shown. At block 402, the configuration file and firmware file are obtained from a smart sensor-based device. At block 404, methods of cyber-attacking the smart sensor-based device are obtained based on the parameters of the smart sensor-based device described in the configuration file and the firmware file. At block 406, modeling techniques are used to simulate cyber-attacks to determine estimated time intervals for performing each attack based on different input parameters. Furthermore, based on historical data of previous cyber-attacks, a probability of each cyber-attack occurring is calculated. This may be based on a historical number of similar cyber-attacks. For example, if a particular type smart sensor-based device or device configuration has historically been cyber-attacked using a particular method, the system will assign a high probability to cyber-attack method. If, on the other hand, a type of smart sensor-based device or device configuration has historically had a low instance of a particular cyber-attack, the system assigns a low probability. Additionally, the longer an cyber-attack takes to perform, or greater the resources required to perform the cyber-attack, the less likely that hacker would use that form of cyber-attack. Therefore, the probability is also based on the time and resources necessary to perform the cyber-attack.

At block 408, mitigation processes are simulated using different input parameters. An estimated time interval for performing each mitigation process based on different input parameters is calculated. Furthermore, historical usage data is retrieved from the smart sensor-based device and processed to determine, for example, the essential, non-essential, most used, least used features of the smart sensor-based device. At block 410, the cyber-attack times and probability are compared with the mitigation processes and the use statistics of the smart sensor-based device. The comparison is used to provide a list of features, description of mitigating processes, and associated risk-levels at block 412. At block 414, the system assists in executing the mitigation process.

Additional processes may also be included. It should be understood that the processes depicted in FIG. 4 represent illustrations, and that other processes may be added or existing processes may be removed, modified, or rearranged without departing from the scope and spirit of the present invention.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure that includes a network of interconnected nodes.

Figure 5:
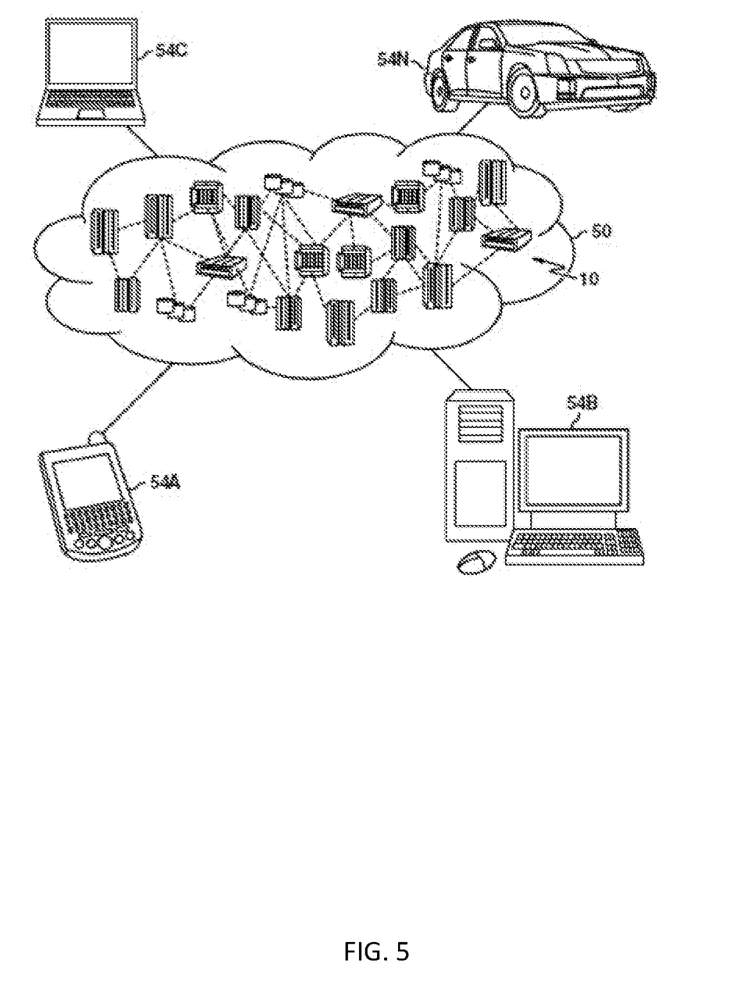
FIG. 5 depicts a cloud computing environment according to one or more embodiments of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 6:
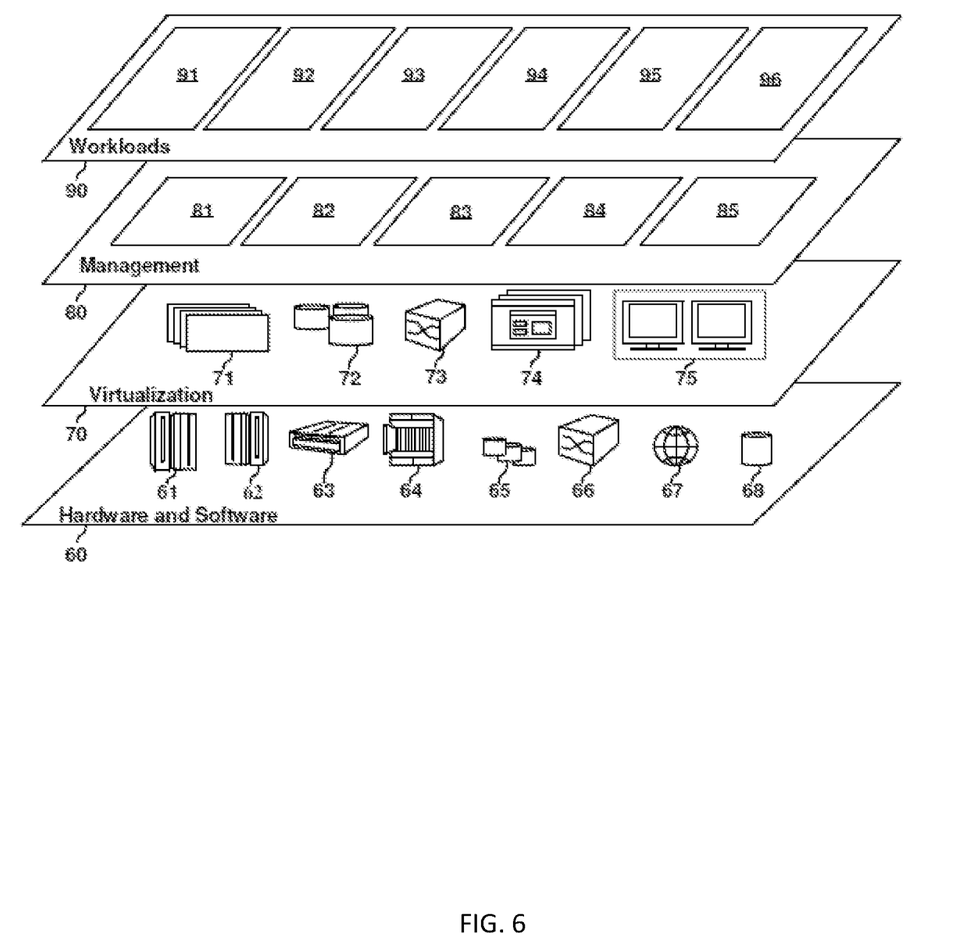
FIG. 6 depicts abstraction model layers according to one or more embodiments of the present invention.

Referring now to FIG. 6, a set of functional abstraction layers provided by cloud computing environment 50 (FIG. 1) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and expanded concept matching 96.

Figure 7:
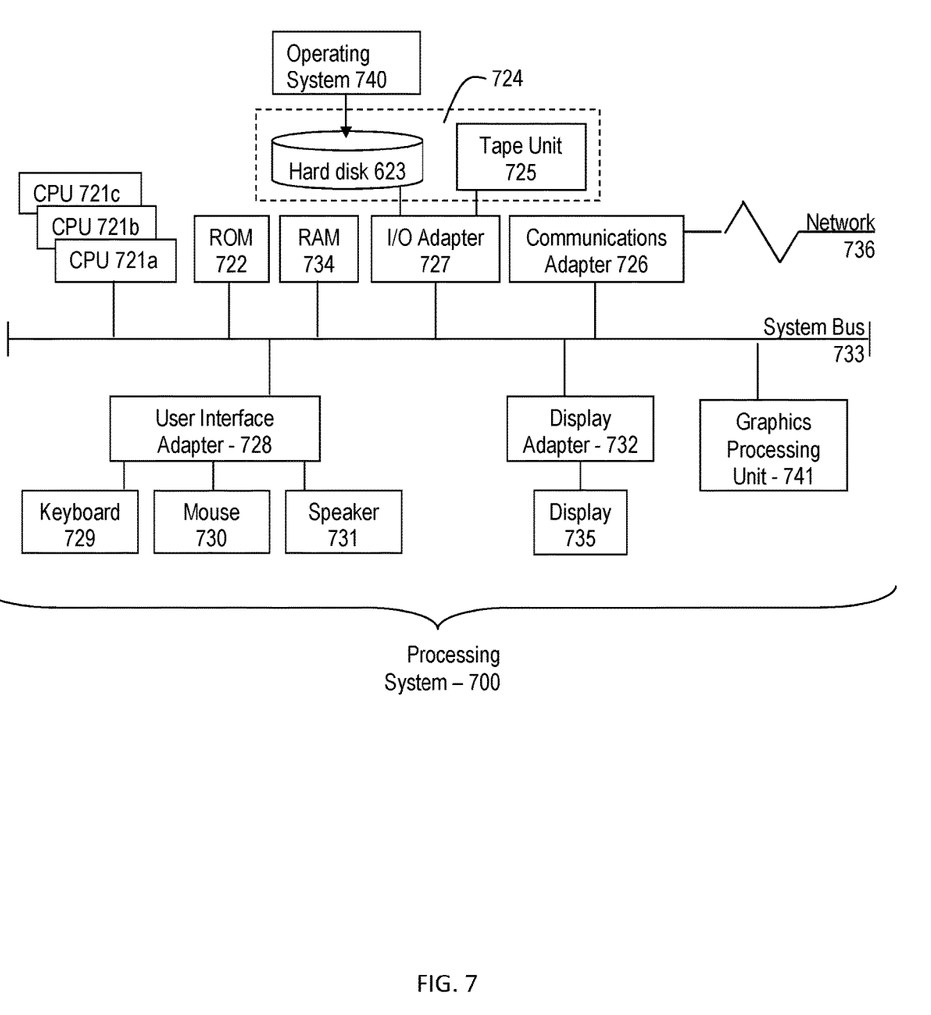
FIG. 7 depicts a block diagram of a computer system for use in implementing one or more embodiments of the present invention.

It is understood that the present disclosure is capable of being implemented in conjunction with any other type of computing environment now known or later developed. For example, FIG. 7 depicts a block diagram of a processing system 700 for implementing the techniques described herein. In examples, the processing system 700 has one or more central processing units (processors) 721*a*, 721*b*, 721*c*, etc. (collectively or generically referred to as processor(s) 721 and/or as processing device(s)). In aspects of the present disclosure, each processor 721 can include a reduced instruction set computer (RISC) microprocessor. Processors 721 are coupled to system memory (e.g., random access memory (RAM) 724) and various other components via a system bus 733. Read only memory (ROM) 722 is coupled to system bus 733 and may include a basic input/output system (BIOS), which controls certain basic functions of the processing system 700.

Further depicted are an input/output (I/O) adapter 727 and a network adapter 726 coupled to the system bus 733. I/O adapter 727 may be a small computer system interface (SCSI) adapter that communicates with a hard disk 723 and/or a storage device 725 or any other similar component. I/O adapter 727, hard disk 723, and storage device 725 are collectively referred to herein as mass storage 734. Operating system 740 for execution on processing system 700 may be stored in mass storage 734. The network adapter 726 interconnects system bus 733 with an outside network 736 enabling processing system 700 to communicate with other such systems.

A display (e.g., a display monitor) 735 is connected to the system bus 733 by display adapter 732, which may include a graphics adapter to improve the performance of graphics intensive applications and a video controller. In one aspect of the present disclosure, adapters 726, 727, and/or 732 may be connected to one or more I/O busses that are connected to the system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. An input device 729 (e.g., a keyboard, a microphone, a touchscreen, etc.), an input pointer 730 (e.g., a mouse, trackpad, touchscreen, etc.), and/or a speaker 731 may be interconnected to system bus 733 via user interface adapter 728, which may include, for example, a Super I/O chip integrating multiple device adapters into a single integrated circuit.

In some aspects of the present disclosure, the processing system 700 includes a graphics processing unit 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing and has a highly parallel structure that makes it more effective than general-purpose CPUs for algorithms where processing of large blocks of data is done in parallel.

Thus, as configured herein, the processing system 700 includes processing capability in the form of processors 721, storage capability including system memory (e.g., RAM 724), and mass storage 734, input means such as keyboard 729 and mouse 730, and output capability including speaker 731 and display 735. In some aspects of the present disclosure, a portion of system memory (e.g., RAM 724) and mass storage 734 collectively store the operating system 740 to coordinate the functions of the various components shown in the processing system 700.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    performing, using a processor, simulations of a form of cyber-attack based on a first set of different input parameters to determine a respective time to perform each cyber-attack on a plurality of features of a sensor-based device;
    performing, using the processor, simulations of a plurality of mitigating processes for each cyber-attack based on a second set of different input parameters to determine a respective time to perform each mitigating process;
    determining an associated risk level of each cyber-attack based at least in part on the simulations;
    building a list of possible mitigation processes based on a comparison of the respective times to perform each cyber-attack and the respective times to perform each mitigating process;
    receiving, from the sensor-based device, usage data for each of the plurality of features, wherein the usage data for a respective feature defines a percentage usage of the respective feature;
    modifying the list of possible mitigation processes to ignore each feature having a percentage usage above a predetermined threshold;
    selecting a mitigation process from the modified list of possible mitigation processes based at least in part on the associated risk levels; and
    completing, by the processor, the mitigation process selected from the modified list by modifying code of the sensor-based device.

2. The computer-implemented method of claim 1, wherein the mitigation process comprises disabling a feature of the sensor-based device.

3. The computer-implemented method of claim 1 further comprising:
    providing a list of features and associated risk-levels.

4. The computer-implemented method of claim 1 further comprising:
    retrieving a configuration file and a firmware file from the sensor; and
    using parameters retrieved from the configuration file and the firmware file to perform the simulations.

5. The computer-implemented method of claim 1 further comprising:
    determining a probability of the cyber-attack occurring, wherein the associated risk-level is based at least in part on the probability.

6. The computer-implemented method of claim 1, wherein the first set of different input parameters of the form of cyber-attack comprise variation in resources used to perform the cyber-attack.

7. The computer-implemented method of claim 1, wherein the second set of different input parameters of the mitigation processes comprise variation in resources used to perform the mitigation processes.

8. A system comprising:
    a memory having computer readable instructions; and
    one or more processors for executing the computer readable instructions, the computer readable instructions controlling the one or more processors to perform operations comprising:
        performing, using a processor, simulations of a form of cyber-attack based on a first set of different input parameters to determine a respective time to perform each cyber-attack on a plurality of features of a sensor-based device;
        performing, using the processor, simulations of a plurality of mitigating processes for each cyber-attack based on a second set of different input parameters to determine a respective time to perform each mitigating process;

determining an associated risk level of each cyber-attack based at least in part on the simulations;

building a list of possible mitigation processes based on a comparison of the respective times to perform each cyber-attack and the respective times to perform each mitigating process;

receiving, from the sensor-based device, usage data for each of the plurality of features, wherein the usage data for a respective feature defines a percentage usage of the respective feature;

modifying the list of possible mitigation processes to ignore each feature having a percentage usage above a predetermined threshold;

selecting a mitigation process from the modified list of possible mitigation processes based at least in part on the associated risk levels; and completing, by the processor, the mitigation process selected from the modified list by modifying code of the sensor-based device.

9. The system of claim 8, wherein the mitigation process comprises disabling a feature of the sensor-based device.

10. The system of claim 8, the operations further comprising:

providing a list of features and associated risk-levels.

11. The system of claim 8, the operations further comprising:

retrieving a configuration file and a firmware file from the sensor; and using parameters retrieved from the configuration file and the firmware file to perform the simulations.

12. The system of claim 8, the operations further comprising:

determining a probability of the cyber-attack occurring, wherein the associated risk-level is based at least in part on the probability.

13. The system of claim 8, the operations further comprising:

determining a usage of each feature of the sensor, wherein the selected mitigation process is based at least in part on the usage.

14. The system of claim 8, wherein the first set of different input parameters of the form of cyber-attack comprise variation in resources used to perform the cyber-attack.

15. The system of claim 8, wherein the second set of different input parameters of the mitigation processes comprise variation in resources used to perform the mitigation processes.

16. A computer program product comprising a computer readable storage medium having program instructions embodied therewith, the program instructions executable by a processor to cause the processor to perform operations comprising:

performing, using a processor, simulations of a form of cyber-attack based on a first set of different input parameters to determine a respective time to perform each cyber-attack on a plurality of features of a sensor-based device;

performing, using the processor, simulations of a plurality of mitigating processes for each cyber-attack based on a second set of different input parameters to determine a respective time to perform each mitigating process;

determining an associated risk level of each cyber-attack based at least in part on the simulations;

building a list of possible mitigation processes based on a comparison of the respective times to perform each cyber-attack and the respective times to perform each mitigating process;

receiving, from the sensor-based device, usage data for each of the plurality of features, wherein the usage data for a respective feature defines a percentage usage of the respective feature;

modifying the list of possible mitigation processes to ignore each feature having a percentage usage above a predetermined threshold;

selecting a mitigation process from the modified list of possible mitigation processes based at least in part on the associated risk levels; and completing, by the processor, the mitigation process selected from the modified list by modifying code of the sensor-based device.

17. The computer-program product of claim 16, wherein the mitigation process comprises disabling a feature of the sensor-based device.

18. The computer-program product of claim 16, the operations further comprising:

providing a list of features and associated risk-levels.

19. The computer-program product of claim 16, the operations further comprising:

retrieving a configuration file and a firmware file from the sensor; and using parameters retrieved from the configuration file and the firmware file to perform the simulations.

* * * * *